(12) United States Patent
Baek et al.

(10) Patent No.: US 12,225,434 B2
(45) Date of Patent: Feb. 11, 2025

(54) METHOD AND APPARATUS FOR TRANSMITTING AND RECEIVING DATA IN WIRELESS COMMUNICATION SYSTEM

(71) Applicant: SAMSUNG ELECTRONICS CO., LTD., Suwon-si (KR)

(72) Inventors: Youngkyo Baek, Suwon-si (KR); Sangsoo Jeong, Suwon-si (KR); Jungje Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 349 days.

(21) Appl. No.: 17/754,141

(22) PCT Filed: Sep. 23, 2020

(86) PCT No.: PCT/KR2020/012851
§ 371 (c)(1),
(2) Date: Mar. 24, 2022

(87) PCT Pub. No.: WO2021/060823
PCT Pub. Date: Apr. 1, 2021

(65) Prior Publication Data
US 2022/0295236 A1 Sep. 15, 2022

(30) Foreign Application Priority Data

Sep. 27, 2019 (KR) .......... 10 2019 0120127
May 21, 2020 (KR) .......... 10 2020 0061128

(51) Int. Cl.
H04W 4/06 (2009.01)
H04W 28/02 (2009.01)
(Continued)

(52) U.S. Cl.
CPC ......... *H04W 4/06* (2013.01); *H04W 28/0268* (2013.01); *H04W 76/12* (2018.02); *H04W 76/40* (2018.02)

(58) Field of Classification Search
CPC . H04W 76/12; H04W 76/40; H04W 28/0268; H04W 4/06
See application file for complete search history.

(56) References Cited

U.S. PATENT DOCUMENTS 9,826,502 B2 11/2017 Cherian et al.
9,912,569 B2 3/2018 Fanson
(Continued)

FOREIGN PATENT DOCUMENTS

KR 10-2012-0072964 A 7/2012
KR 10-1171534 B1 8/2012
(Continued)

OTHER PUBLICATIONS

Translation of the Written Opinion of the International Searching Authority in connection with International Application No. PCT/KR2020/012851 issued Dec. 21, 2020, 10 pages.
(Continued)

*Primary Examiner* — Ajay Cattungal

(57) ABSTRACT

According to an embodiment of the disclosure, a base station (BS) is configured to: transmit traffic to at least one user equipment (UE) connected to the BS via a unicast scheme; based on information about a number of UEs connected to the BS to use a particular application, a particular service, or a particular session, or information of traffic to be used by the UE, determine whether to switch a transmission scheme of the traffic from the unicast scheme to a broadcast/multicast scheme; and as the broadcast/multicast scheme is
(Continued)

determined as the transmission scheme of the traffic, transmit a message informing that the transmission scheme of the traffic is to be switched.

15 Claims, 10 Drawing Sheets

(51) Int. Cl.
*H04W 76/12* (2018.01)
*H04W 76/40* (2018.01)

(56) References Cited

U.S. PATENT DOCUMENTS

| | | | | |
|---|---|---|---|---|
| 2013/0028118 | A1* | 1/2013 | Cherian | H04W 72/30 |
| | | | | 370/252 |
| 2013/0315125 | A1* | 11/2013 | Ravishankar | H04W 36/0007 |
| | | | | 370/312 |
| 2015/0036494 | A1* | 2/2015 | Kotecha | H04L 65/00 |
| | | | | 370/312 |
| 2015/0124686 | A1* | 5/2015 | Zhang | H04W 76/40 |
| | | | | 370/312 |
| 2017/0311110 | A1* | 10/2017 | Chan | H04L 1/0025 |
| 2020/0267691 | A1* | 8/2020 | Maeder | H04W 76/40 |
| 2022/0159652 | A1* | 5/2022 | Bae | H04W 72/0446 |

FOREIGN PATENT DOCUMENTS

| | | |
|---|---|---|
| KR | 10-1365775 B1 | 2/2014 |
| KR | 10-2014-0041896 A | 4/2014 |
| KR | 10-2017-0113755 A | 10/2017 |
| KR | 10-2021-0023614 A | 3/2021 |
| WO | 2019/042560 A1 | 3/2019 |

OTHER PUBLICATIONS

International Search Report and Written Opinion of the International Searching Authority in connection with International Application No. PCT/KR2020/012851 issued Dec. 21, 2020, 11 pages.

\* cited by examiner

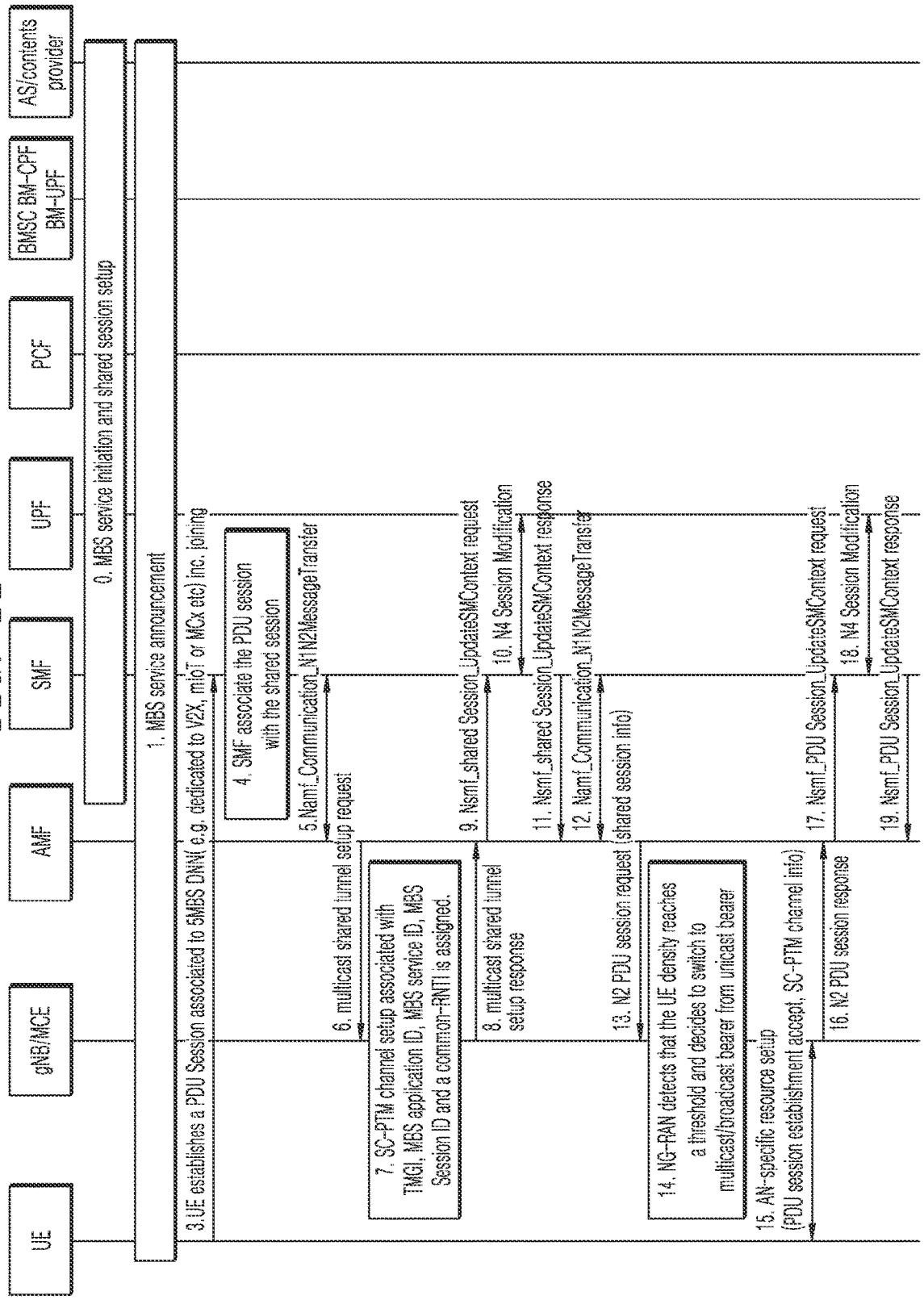

METHOD AND APPARATUS FOR TRANSMITTING AND RECEIVING DATA IN WIRELESS COMMUNICATION SYSTEM

CROSS-REFERENCE TO RELATED APPLICATIONS

This application is a 371 of International Application No. PCT/KR2020/012851, filed Sep. 23, 2020, which claims priority to Korean Patent Application No. 10 2019 0120127, filed Sep. 27, 2019, and Korean Patent Application No. 10 2020 0061128, filed May 21, 2020, the disclosures of which are herein incorporated by reference in their entirety.

BACKGROUND

1. Field

The disclosure relates to a method of effectively switching a data transmission scheme in a wireless communication system that supports a multicast/broadcast service (MBS).

2. Description of Related Art

To meet the increase in demand with respect to wireless data traffic after the commercialization of 4th Generation (4G) communication systems, considerable efforts have been made to develop improved 5th Generation (5G) communication systems or pre-5G communication systems. For this reason, 5G communication systems or pre-5G communication systems are called beyond 4G network communication systems or post Long Term Evolution (LTE) systems. To achieve a high data rate, the implementation of 5G communication systems in an ultra-high frequency band (millimeter wave (mmWave)) (e.g., a 60 GHz band) is under consideration. To alleviate path loss of radio waves and increase propagation distances of radio waves in a millimeter wave band, technologies for 5G communication systems, such as beamforming, massive multi-input multi-output (MIMO), full dimensional MIMO (FD-MIMO), array antenna, analog beamforming, and large-scale antenna system are being discussed. Also, in order to improve a system network for 5G communication systems, technologies, such as evolved small cell, advanced small cell, cloud radio access network (cloud RAN), ultra-dense network, Device-to-Device (D2D) communication, wireless backhaul, moving network, cooperative communication, Coordinated Multi-Points (CoMP), and reception interference cancellation, are being developed. In addition, in the 5G system, an advanced coding modulation (ACM), e.g., Hybrid FSK and QAM Modulation (FQAM), sliding window superposition coding (SWSC), and an advanced access technology, e.g., filter bank multi carrier (FBMC), non-orthogonal multiple access (NOMA), sparse code multiple access (SCMA) are being developed.

Meanwhile, the Internet has evolved from a human-centered connection network, through which humans generate and consume information, to an Internet of Things (IoT) network that exchanges and processes information between distributed elements such as objects. An Internet of Everything (IoE) technology is emerging, in which a technology related to the IoT is combined with, for example, a technology for processing big data through connection with a cloud server. In order to implement the IoT, various technical components are required, such as a sensing technique, wired/wireless communication and network infrastructures, a service interfacing technique, a security technique, and the like. In recent years, techniques including a sensor network for connecting objects, Machine-to-Machine (M2M) communication, Machine Type Communication (MTC), etc., have been studied. In the IoT environment, intelligent Internet Technology (IT) services may be provided to collect and interpret data obtained from objects connected to each other, and to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, and the like.

Various attempts are being made to apply 5G communication systems to IoT networks. For example, 5G communication including sensor networks, M2M communication, MTC, etc., is implemented by using schemes such as beamforming, MIMI), array antenna, and the like. The application of cloud RAN as the big data processing technology described above may be an example of convergence of 5G communication technology and IoT technology.

As various services can be provided with the advancement of a mobile communication system as described above, measures for effectively providing the services are demanded.

In a mobile communication network, in order to transmit the same data to a plurality of user equipments (UEs) in a specific area, the data may be transmitted to each of the UEs via unicast. However, for efficiency of resources, it is necessary to transmit data for service provision via multicast/broadcast. For example, for a vehicle-to-everything (V2X) service, a massive cellular Internet of Things (CIoT), or a public safety service such as mission critical communication, a method of transmitting data to a plurality of UEs in a specific area via multicast/broadcast is necessary. In addition, in this case, a method for minimizing service interruption due to switching of data transmission scheme from unicast to multicast/broadcast is necessary. The disclosure provides a method of flexibly switching transmission schemes, such as unicast and multicast/broadcast.

Further, the disclosure relates to a method of measuring the number of UEs serviced in a base station (BS) or a cell or an amount of traffic consumed by the UEs and determining whether to switch from unicast to multicast/broadcast based on a result of the measurement. In addition, the disclosure relates to a method of identifying and recognizing, by the BS, a packet of unicast traffic that is capable of switching from unicast to multicast/broadcast. In addition, the disclosure relates to a method of replacing a tunnel for transmitting unicast traffic between an NG-radio access network (RAN) and a user plane function (UPF) with a tunnel for transmitting traffic for multi cast/broadcast, when the unicast traffic is switched to the multicast/broadcast traffic.

A method of transmitting and receiving data by a base station (BS) in a wireless communication system according to an embodiment includes transmitting traffic to at least one user equipment (UE) connected to the BS via a unicast scheme, based on information about a number of UEs connected to the BS to use a particular application, a particular service, or a particular session, or information of traffic to be used by the UE, determining whether to switch a transmission scheme of the traffic from the unicast scheme to a broadcast/multicast scheme, and as the broadcast/multicast scheme is determined as the transmission scheme of the traffic, transmitting a message informing that the transmission scheme of the traffic is to be switched.

In the disclosure, by maximizing the use of an existing unicast-based 5G system (5GS) network structure, a multicast/broadcast system (MBS) may be locally and flexibly applied, and thus, resources may be effectively used.

BRIEF DESCRIPTION OF DRAWINGS

FIG. 11 is a diagram illustrating a method of determining, by a BS, whether to switch from a unicast scheme to a multicast/broadcast scheme based on N2 context, according to an embodiment of the disclosure.

DETAILED DESCRIPTION

Figure 1:
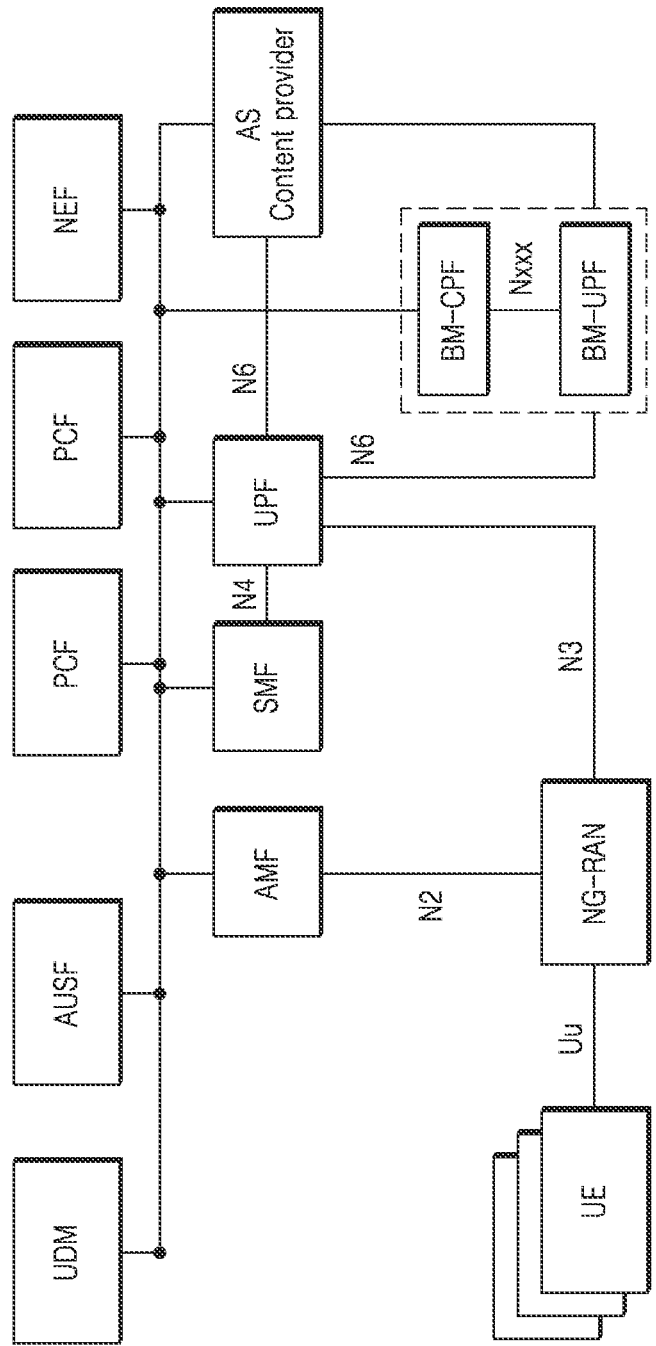
FIG. 1 illustrates a 5G system (5GS) structure for supporting a multicast/broadcast system (MBS) based on a unicast 5GS, according to an embodiment of the disclosure.

A method of transmitting and receiving data by a base station (BS) in a wireless communication system according to an embodiment includes transmitting traffic to at least one user equipment (UE) connected to the BS via a unicast scheme, based on information about a number of UEs connected to the BS to use a particular application, a particular service, or a particular session, or information of traffic to be used by the UE, determining whether to switch a transmission scheme of the traffic from the unicast scheme to a broadcast/multicast scheme, and as the broadcast/multicast scheme is determined as the transmission scheme of the traffic, transmitting a message informing that the transmission scheme of the traffic is to be switched.

According to an embodiment, the method may further include, when the number of UEs using the particular application, the particular service, or the particular session or the traffic of the UE exceeds a threshold, transmitting, to a core network device, an event subscription message requesting a notification therefor, wherein the determining whether to switch from the unicast scheme to the broadcast/multicast scheme includes, as the notification is received from the core network device, determining the broadcast/multicast scheme as the transmission scheme.

According to an embodiment, the method may further include transmitting, to a core network device, an event subscription message requesting the information about the number of UEs using the particular application, the particular service, or the particular session or the traffic of the UE, wherein the determining whether to switch from the unicast scheme to the broadcast/multicast scheme includes, as a result of determining based on the information about the number of UEs or the traffic of the UE received from the core network device, when the number of UEs or the traffic of the UE exceeds a threshold, determining the broadcast/multicast scheme as the transmission scheme.

According to an embodiment, the method may further include, transmitting, to the at least one UE, a message requesting confirmation as to whether the particular application, the particular service, or the particular session is used, wherein the determining whether to switch from the unicast scheme to the broadcast/multicast scheme includes, based on information received from the UE in response to the requesting, determining the broadcast/multicast scheme as the transmission scheme.

According to an embodiment, the method may further include, based on a value included in a general packet radio service (GPRS) tunnelling protocol user (GTP-U) of traffic obtained by the BS, identifying whether the at least one UE uses traffic of the particular application, the particular service, or the particular session that is transmittable by using the broadcast/multicast scheme, wherein the determining whether to switch from the unicast scheme to the broadcast/multicast scheme includes, as a result of the identifying, when the number of ills or the traffic of the UE exceeds a threshold, determining the broadcast/multicast scheme as the transmission scheme.

According to an embodiment, the method may further include, based on a 5G quality of service (QoS) identifier (5QI) for a flow of a QoS of traffic obtained by the BS, identifying whether the at least one UE uses traffic of the particular application, the particular service, or the particular session that is transmittable by using the broadcast/multicast scheme, wherein the determining whether to switch from the unicast scheme to the broadcast/multicast scheme includes, as a result of the identifying, when the number of UEs or the traffic of the UE exceeds a threshold, determining the broadcast/multicast scheme as the transmission scheme.

According to an embodiment of the disclosure, a method of transmitting and receiving data by a user equipment (UE) in a wireless communication system according to an embodiment includes transmitting traffic to a base station (BS) via a unicast scheme, as a transmission scheme is switched from the unicast scheme to a broadcast/multicast scheme based on information about a number of UEs connected to the BS so as to use a particular application, a particular service, or a particular session, or information of traffic to be used by the UE, receiving a message informing that the transmission scheme of the traffic is to be switched, as the message is received, identifying an application, a service, or a session in which the transmission scheme is changed, and receiving traffic of the identified application, the identified service, or the identified session according to the broadcast/multicast scheme.

According to an embodiment, the transmission scheme of the traffic may be switched from the unicast scheme to the broadcast/multicast scheme when the number of UEs using the particular application, the particular service, or the particular session, or the traffic of the UE exceeds a threshold.

According to an embodiment, the method may further include receiving, from the BS, a message requesting confirmation as to whether the particular application, the particular service, or the particular session is used, and as the UE uses traffic of any of the particular application, the particular service, and the particular session, transmitting, to the BS, a message informing that the traffic is used.

A base station (BS) configured to transmit and receive data in a wireless communication system according to an embodiment includes a transceiver, and a processor connected to the transceiver, wherein the processor is configured to control the transceiver to transmit traffic to at least one user equipment (UE) connected to the BS via a unicast scheme, based on information about a number of UEs connected to the BS to use a particular application, a particular service, or a particular session, or information of traffic to be used by the UE, to determine whether to switch a transmission scheme of the traffic from the unicast scheme to a broadcast/multicast scheme, and as the broadcast/multicast scheme is determined as the transmission scheme of the traffic, to control the transceiver to transmit a message informing that the transmission scheme of the traffic is to be switched.

A user equipment (UE) configured to transmit and receive data in a wireless communication system according to an embodiment includes a transceiver, and a processor connected to the transceiver, wherein the processor is configured to control the transceiver to transmit traffic to a base station (BS) via a unicast scheme, as a transmission scheme is switched from the unicast scheme to a broadcast/multicast scheme based on information about a number of UEs connected to the BS so as to use a particular application, a particular service, or a particular session, or information of traffic to be used by the UE, to control the transceiver to receive a message informing that the transmission scheme of the traffic is to be switched, and as the message is received, to identify an application, a service, or a session in which the transmission scheme is changed, and to receive traffic of the identified application, the identified service, or the identified session according to the broadcast/multicast scheme.

Hereinafter, the operating principle of the disclosure will be described in detail with reference to the accompanying drawings. In describing the disclosure, when the detailed description of the relevant known functions or configurations is determined to unnecessarily obscure the gist of the disclosure, the detailed description thereof may be omitted. In addition, the terms to be described below are terms defined in consideration of functions in the disclosure, which may vary according to intentions or customs of users and operators. Therefore, the definition should be made based on the content throughout the disclosure.

The term for identifying an access node, the term referring to network entities, the term referring to messages, the term referring to an interface between network entities, the terms referring to a variety of identification information, and the like are exemplified for convenience of description. Therefore, the disclosure is not limited to the terms to be described later, and other terms referring to entities having an equivalent technical caning may be used.

In addition, a network function (NF), or a function, according to an embodiment of the disclosure is software including one or more instructions for performing the corresponding function, and may be stored in a processor within a network entity. However, this is only an example, and according to another embodiment, an NF may also be referred to as a network function processing device, and may be a hardware device including a processor for processing a signal and a memory.

Hereinafter, for convenience of description, the disclosure uses terms and names defined in a standard for 5GS. However, the disclosure is not limited by the terms and names and may be equally applied to systems conforming to other standards.

FIG. 1 illustrates a 5G system (5GS) structure for supporting a multicast/broadcast system (MBS) based on a unicast 5GS, according to an embodiment of the disclosure.

In a 5GS, to support an MBS, a cellular system according to an embodiment for an MBS may include the following network functions and services. However, this is only an example, and a system for providing a method of switching between unicast and multicast/broadcast is not limited to the following elements.

When an application server (e.g., a vehicle to everything (V2X) server, a cellular Internet of Things (CIoT) application server, or a mission critical push-to-talk (MCPTT) application server) or a contents provider (e.g., a television (TV) service providing server, an audio service providing server, or a streaming video service providing server) requests an MBS, a broadcast/multicast-control plane function (BM-CPF) for managing the corresponding MBS service session and controlling the corresponding MBS service traffic and a broadcast/multicast-user plane function (BM-UPF), which is an MBS media anchor that receives media from an application server (AS) or a contents provider to process media traffic as controlled by the BM-CPF, may be included in the system. Interface between the BM-CPF and the BM-UPF may be referred to as Nxxx interface. Meanwhile, the BM-CPF and the BM-UPF may be integrated into one entity or one network function (NF).

According to an existing technique for an MBS, the MBS is performed through the following procedure. First, when a user equipment (UE) identifies that an MBS is enabled, UEs desiring to receive the service may register for the service for the MBS if necessary, and perform a procedure for obtaining necessary associated parameters for receiving the service.

Meanwhile, in the 5GS, a session for transmitting MBS data may be generated, and a signaling procedure for generating and managing a tunnel for transmitting the MBS data from an MBS provider or an AS to a BS in the corresponding area may be performed.

When the MBS data is arrived at the BS via the tunnel, the BS may broadcast information about the existence of MBS data to be transmitted and when and how the MBS data is to be transmitted so that the UEs obtaining the MBS service parameters may identify the information, and then the BS may broadcast the MBS data according to the information.

When the MBS is no longer provided, the BS may release the generated session and remove a tunnel assigned for the session.

Figure 2:
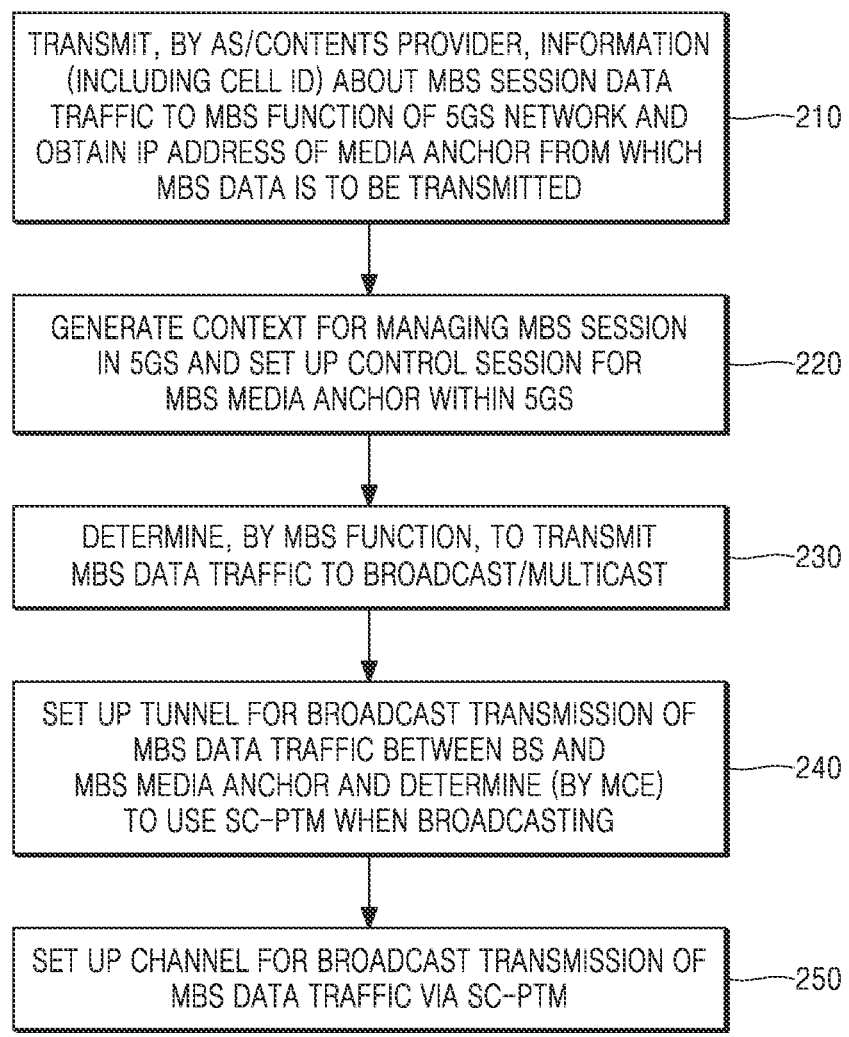
FIG. 2 is a flowchart of a process of multicasting/broadcasting an MBS session by using a single cell point to multipoint (SC-PTM) scheme, according to the related art.

FIG. 2 is a flowchart of a process of multicasting/broadcasting an MBS session by using a single cell point to multipoint (SC-PTM) scheme, according to the related art.

In operation 210, in order to transmit MBS data traffic via the 5GS, an AS or an MBS contents provider may transmit information about MBS session data traffic to an MBS function of the 5GS network and obtain Internet Protocol (IP) address information of a media anchor within the 5GS from which the MBS data is to be transmitted. The information about the MBS session data traffic may include not only characteristics of the MBS session data, but also an identification (ID) of a BS or cell from which the MBS session data traffic is to be transmitted.

For example, the above-described MBS function may include a BM-CPF, a session management function (SMF) to which an MBS session management function is added, or a broadcast multicast service center (BMSC).

In addition, the media anchor within the 5GS may include a BM-UPF, a user plane function UPF) to which a media source function for the MBS service session is added, or a BMSC.

In operation 220, the MBS function may generate MBS context for managing an MBS session in the 5GS and configure a control session for the MBS media anchor within the 5GS.

In operation 230, the MBS function may determine whether to transmit the MBS data traffic via broadcast/multicast. The determination of a transmission scheme may be performed according to a density or population of UEs receiving the MB session service, that is, how many UEs are to be serviced in an area within which the transmission via broadcast/multicast is to be performed, or may be determined according to whether a BS at a location at which UEs receiving the MBS session service has an MBS function (e.g., the SC-PTM function).

In operation 240, when it is determined that the MBS data traffic is to be transmitted via broadcast/multicast, the MBS function may generate a tunnel between BSs in an area within which the MBS data traffic is to be broadcast and a media anchor, or may generate a tunnel between the BSs in an area in which the MBS data traffic is transmitted via broadcast/multicast and a UPF for broadcast/multicast or between the BSs and a UPF for an MBS. To this end, a control session for managing the tunnels may be configured.

In operation 240, a multi-cell coordination entity (MCE) may determine whether the BS is to broadcast data based on a multicast broadcast single frequency network (MBSFN) scheme or based on a cell, that is, a SC-PTM scheme.

In operation 250, when it is determined that the MCE is to transmit the MBS data traffic based on the SC-PTM scheme, the BS may generate a channel for transmitting the MBS data traffic via broadcast.

In describing embodiments of the disclosure, an MBS function and a service therefor of the 5GS are referred to as a BM-CPF. However, the MBS function and the service therefor may be present in the SMF, or may be present, as a BMSC, in both a control plane and a user plane. In addition, the media anchor of the 5GS may be referred to as a BM-UPF. However, this is only an example, and the media anchor may be present in the UPF, or may be present, as a BMC, in both a control plane and a user plane.

The BM-CPF may perform a function of receiving MBS data from the AS or the MBS contents provider and controlling transmission of the MBS data via the 5GS by performing a service announcement for the MBS service in the 5GS, managing an MBS user service session, determining whether to transmit the MBS data via broadcast/multicast or unicast, or managing a BM-UPF, which is a media anchor.

Figure 3:
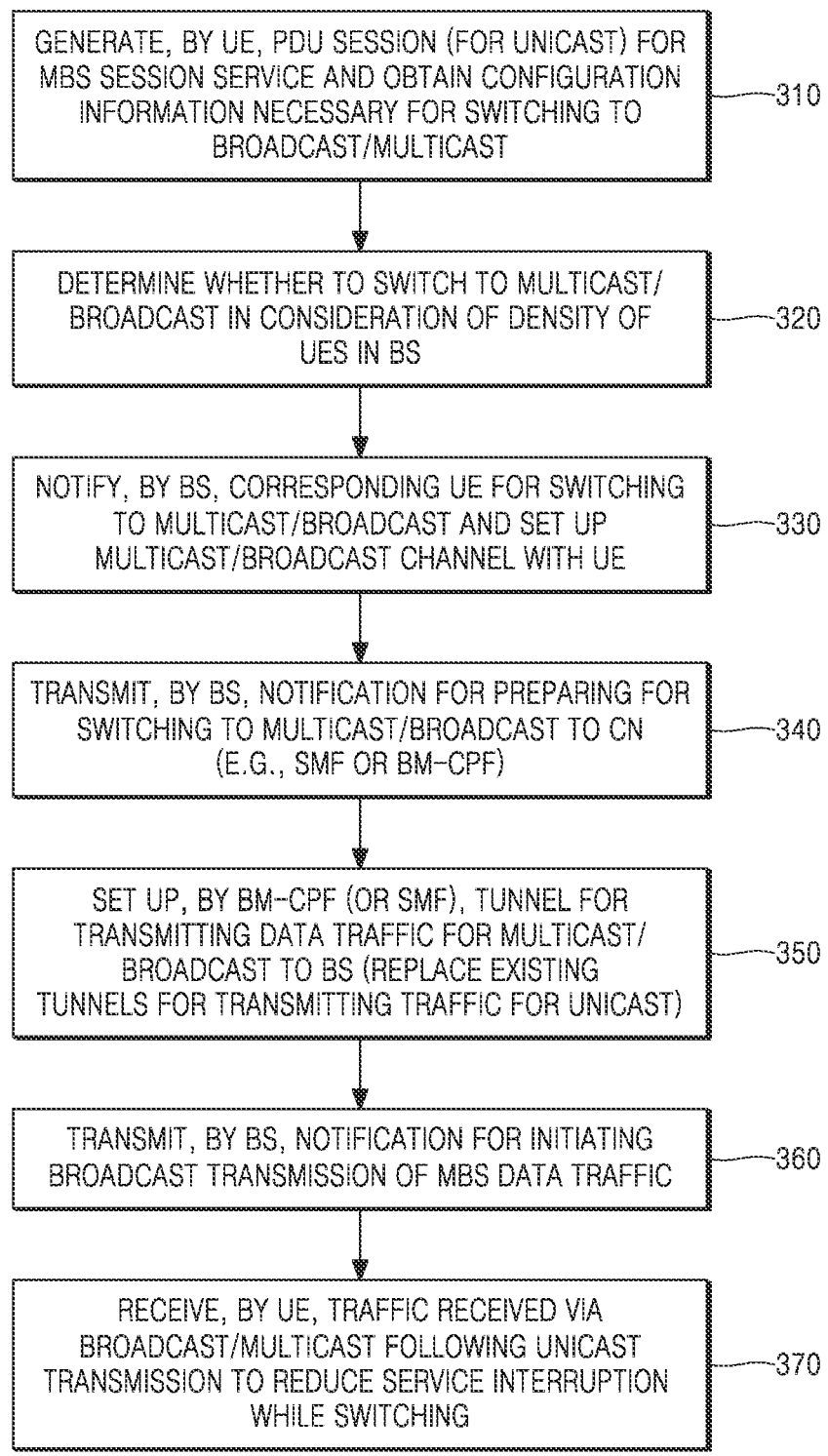
FIG. 3 is a flowchart of a method of providing a service by servicing MBS session traffic by using a unicast scheme and then switching to a multicast/broadcast scheme, according to an embodiment of the disclosure.

FIG. 3 is a flowchart of a method of providing a service by servicing MBS session traffic by using a unicast scheme and then switching to a multicast/broadcast scheme, according to an embodiment of the disclosure.

In operation 310, a UE may generate a protocol data unit (PDU) session for unicast for an MBS session service, and in this case, may obtain UE configuration information necessary for switching to broadcast/multicast through an accept message for a PDU session setup. For example, when the UE transmits a PDU session setup request message, a data network name (DNN) for an MBS session service to be received by the UE may be included in the PDU session setup request message. For example, a DNN such as V2X_DNN, which is a DNN for V2X, PS-DNN, which is a DNN for public safety, MC_DNN, which is a DNN for mission critical communication, and TV_DNN, which is a DNN for Internet Protocol television (IPTV), may be included in the PDU session setup request message.

The UE configuration information necessary for switching to broadcast multicast for an MBS session service corresponding to the DNN described above may include information such as a temporary mobile group identity (TMGI), which is group information of UEs for broadcast/multicast an MBS application ID, which is an ID of an application providing an MBS session service used by the UE, an MBS service ID, which is an ID of an MBS session service used by the UE, an MBS session ID, which is an identity for a session of an MBS session service used by the UE, an MBS service flow ID, which is an identity for a service flow of an MBS session service used by the UE, a multicast IP address to be used by the UE, and a common radio network temporary identifier (RNTI) to be used when the BS transmits the data via broadcast/multicast based on the SC-PTM scheme. Meanwhile, in the disclosure, examples of an application may include data streaming applications, messenger applications, video call applications, and the like. In addition, in the disclosure, examples of a service may include a V2X service, an MCPTT service, an IPTV service, and the like. In addition, in the disclosure, a session is a connection at an application level. For example, when the MCPTT service is assumed, the session may include a voice transmission and reception session, an image transmission and reception session, and a file transmission and reception session in association with the MCPTT service. However, this is only an example, and in the disclosure, an application, a service, and a session are not limited to the examples described above.

In another method, after a PDU session is generated or in a process of generating the PDU session, the UE configuration information necessary for switching to broadcast/multicast for the MBS session service may be obtained by the UE by accessing the AS, the MBS contents provider, the BMSC, or the BM-CPF, or may be obtained from the BS.

In operation 320, the BS may determine whether to switch the transmission scheme to broadcast/multicast in consideration of the number of UEs using the MBS session service and an amount of traffic used by the UEs. In order to determine whether to perform switching to a broadcast/multicast scheme, the BS may obtain part or all of information about the number of UEs identified by the BS, such as the number of UEs corresponding to the TMGI, the number of UEs using the same MBS application ID, the number of UEs using the same MBS ID, the number of UES using the same MBS session ID, the number of UEs using the same MBS service flow ID, the number of UEs using the same multicast IP address, or the number of UEs using the same common RNTI. When the number of UEs exceeds a particular threshold, the BS may switch the transmission scheme from unicast to multicast/broadcast based on the obtained information. Meanwhile, the threshold according to an embodiment may be differently configured for each MBS application, MBS service, MBS session, MBS service flow, and multicast IP address.

In another embodiment, the BS may obtain part or all of information about an amount of traffic or data rate used by the UEs identified by the BS, such as an amount of traffic or data rate used by the UEs corresponding to the TMGI, an amount of traffic or data rate used by the UEs using the same MBS application ID, an amount of traffic or data rate used by the UEs using the same MBS service ID, an amount of traffic or data rate used by the UEs using the same MBS service flow ID, an amount of traffic or data rate used by the UEs using the same multicast IP address, or an amount of traffic or data rate used by the UEs using the same common RNTI. When the amount of traffic or data rate exceeds a particular threshold, the BS may switch the transmission scheme from unicast to broadcast/multicast based on the obtained information. Meanwhile, the threshold according to an embodiment may be differently configured for each MBS application, MBS service, MBS session, MBS service flow, and multicast IP address.

For a value for the threshold, the value may be previously configured in the BS, a network operator may transmit an appropriate value to the BS through operation and maintenance (O&M), or an SMF, a BMSC, or a BM-CPF may transmit an appropriate threshold value to the BS, so that it may be determined whether the BS is to switch the unicast transmission to broadcast/multicast based on the received threshold value.

In operation 330, to prepare for switching to broadcast/multicast, the BS may transmit a notification to UEs that receive a service via unicast and then perform switching to broadcast/multicast to receive the MBS session service.

In addition, in order to transmit traffic via broadcast/multicast, the BS may set up a channel for transmitting the traffic via broadcast/multicast, such as a SC-PTM.

In operation 340, the BS may transmit, to a core network (e.g., an SMF, a BMSC, or a BM-CPF), a notification indicating that the corresponding traffic is switched to broadcast/multicast.

In operation 350, a core network node (e.g., an SMF, a BMSC, or a BM-CPF) receiving the notification may set up a tunnel for transmitting data traffic for broadcast/multicast to the BS. In the disclosure, in describing embodiments, "a tunnel for transmitting data traffic for broadcast/multicast to a BS" is interchangeably used with "an IP multicast tunnel".

If necessary, only a tunnel for transmitting data traffic for broadcast/multicast may be used, instead of the existing tunnels for transmitting traffic for unicast.

In operation 360, when the tunnel is prepared, the BS may transmit, to each of the UEs via broadcast or unicast, a notification informing the UEs that the MBS data traffic is transmitted via broadcast/multicast. Accordingly, by allowing the data traffic received by the UEs via broadcast/multicast to be received following unicast transmission, the BS may reduce service interruption while switching from unicast to broadcast/multicast.

In another embodiment, as in operation 360, when the tunnel for transmitting the data traffic for broadcast/multicast, that is, the IP multicast tunnel, is generated, the BS may receive the MBS data traffic via the IP multicast tunnel. In this case, the BS may determine whether to transmit the MBS data traffic to the UEs all at once via broadcast multicast or separately via unicast. In other words, as in the method of operation 320, the BS may determine a method of transmitting to the UE by the BS, in consideration of the number of UES using the MBS session service or an amount of traffic used by the UEs. To this end, the BS has to be aware of a UE to which the MBS data traffic received via the IP multi cast tunnel is to be transmitted. To this end, the BS may store and manage, in context of a UE served by the BS, a list TMGIs, an MBS service ID, which is an ID of an MBS session service used by the UE, an MBS session ID, which is an identity for a session of an MBS session service used by the UE, an MBS service flow ID, which is an identity for a service flow of an MBS session service used by the UE, or IP multi cast tunnel information. Thus, when received MBS data traffic is to transmitted via unicast, the BS may separately transmit, via a unicast bearer, the MBS data traffic to each of the UEs mapped to an MBS service ID, an MBS session ID, an MBS service flow ID, or IP multicast tunnel information, which are pieces of information about the received MB S data traffic.

Figure 4:
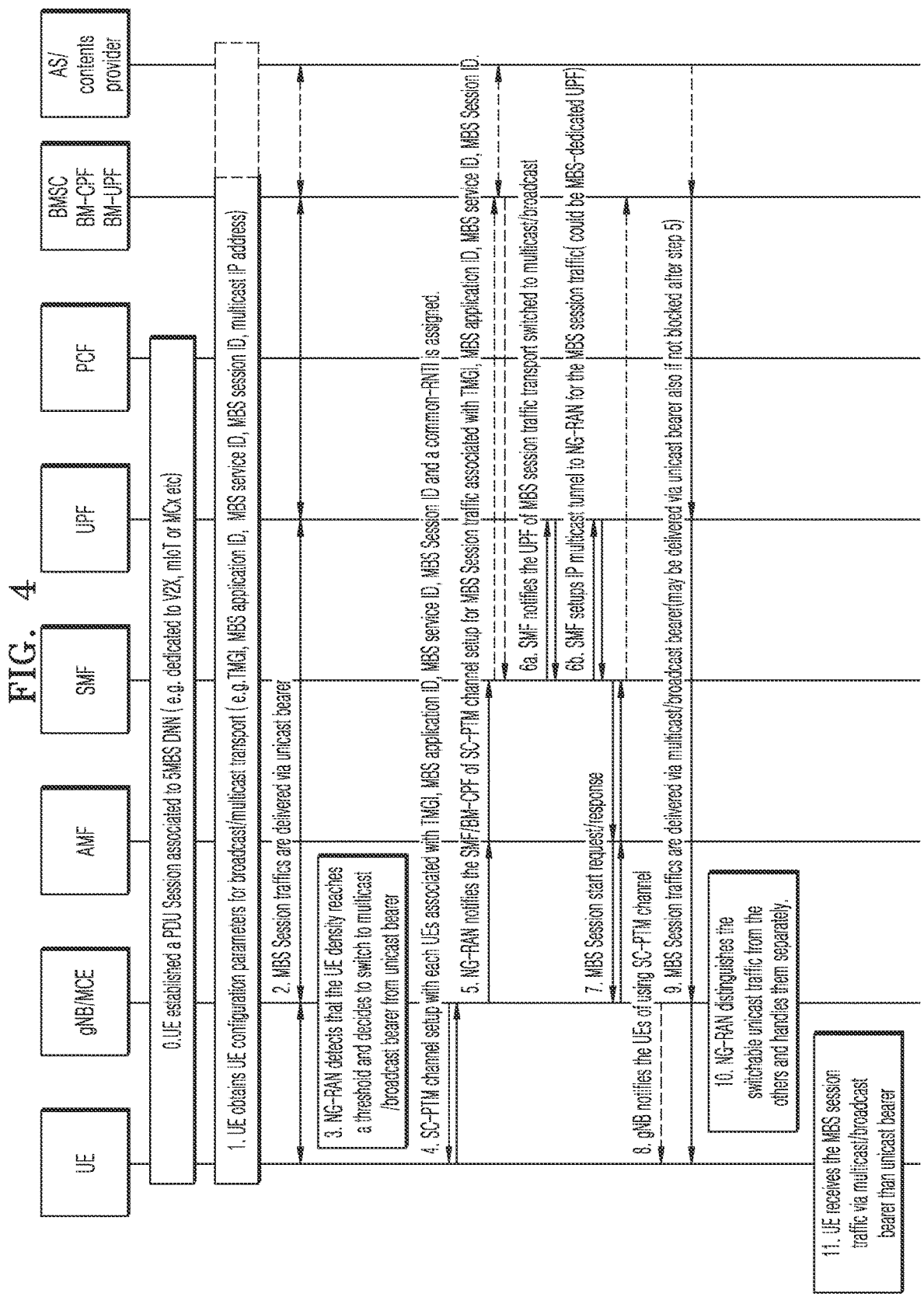
FIG. 4 is a diagram illustrating a detailed process of providing a service by servicing MBS session traffic and then switching to a multicast/broadcast scheme, according to an embodiment of the disclosure.

FIG. 4 is a diagram illustrating a detailed process of providing a service by servicing RIBS session traffic and then switching to a multicast/broadcast scheme, according to an embodiment of the disclosure.

In operation 0, a UE may generate a PDU session for unicast for an MBS session service, and in operation 1, the UE may obtain UE configuration information necessary for switching to broadcast/multicast through an accept message for PDU session setup. For example, when the UE transmits a PDU session setup request message, a DNN for an MBS session service to be received by the UE may be included in the PDU session setup request message. For example, a DNN such as V2X_DNN, which is a DNN for V2X, PS-DNN, which is a DNN for public safety, MC_DNN, which is a DNN for mission critical communication, and TV_DNN, which is a DNN for Internet Protocol television (IPTV), may be included in the PDU session setup request message. For the MBS session service corresponding to the particular DNN, the UE configuration information necessary for switching to broadcast/multicast may include information such as a TMGI, an MBS application ID, an MBS service ID, an MBS session ID, an MBS service flow ID, a multicast IP address, and a common RNTI.

When the UE does not obtain the UE configuration information necessary for switching to broadcast/multicast in operation 1, the UE may obtain the UE configuration information necessary for switching to broadcast/multicast for the MBS session service, from an AS, an MBS contents provider, a BMSC, or a BM-CPF.

In operation 2, the UE may receive the MBS session traffic via a unicast transmission scheme.

In operation 3, the BS may determine to switch a method of service provision from the unicast transmission scheme to the broadcast/multicast transmission scheme. For example, when the number of UEs corresponding to a TMGI, an MBS application ID, an MBS service ID, an MBS session ID, and an MBS service flow ID, an amount of traffic of the corresponding UEs, or a data rate used by the corresponding UEs exceeds a certain threshold, the BS may determine to switch from the unicast transmission scheme to the broadcast/multicast transmission scheme. Meanwhile, a method of determining, by the BS, whether the number of UEs, the amount of traffic of the UEs, or the data rate reaches the threshold is described below.

In operation 4, the BS may set up an SC-PTM channel with the UEs for a broadcast/unicast transmission. Each SC-PTM channel may be mapped to the TMGI, the MBS application ID, the MBS service ID, the MBS session ID, the MBS service flow ID, the multicast IP address, and the common RNTI.

In addition, in operation 5, the BS may transmit, to the SMF via an access and mobility management function (AMF), a message informing that a SC-PTM channel for broadcast/multicast transmission is generated between the UE and the BS, and the SMF may notify this to the BMSC, the BM-CPF, or the AS. The corresponding PDU session ID information and information about a tunnel for unicast may be included in the message transmitted from the BS to the SMF.

Accordingly, the BMSC, the BM-UPF, or the AS may stop the unicast traffic transmission to the UE.

In response to the notification transmitted by the BMSC, the BM-CPF, or the AS by the SMF in operation 5, by transmitting an MBS session start request to the SMF, operation 6*b* may be triggered.

In operation 6*a*, the SMF may notify the UPF that the existing unicast transmission scheme is switched to the broadcast/multicast transmission scheme. Accordingly, the UPF may stop traffic transmission to the unicast tunnel.

In addition, in operation 6*b*, in order to transmit MBS session traffic for broadcast/multicast transmission to an NG-radio access nets network (NG-RAN), the SWF may, along with the session start procedure, select a UPF for broadcast/multicast and set up an IP multicast tunnel from the selected UPF to the BS.

The UPF for broadcast/multicast may be the same UPF as a UPF for unicast, or may be a separate UPF.

Through operation 7, the SMF may transmit the MBS session start request to the BS to set up an IP multicast tunnel with the UPF.

In operation 8, the BS may notify the UEs via the SC-PTM channel that broadcast/multicast is started, and in operation 9, the BS may transmit MBS session traffic for broadcast/multicast transmission received via the IP multicast to the UEs via broadcast/multicast transmission.

In addition, in operation 10, when the MBS session traffic for unicast transmission is still continuously transmitted to the BS, the corresponding unicast traffic may be discarded, or may be stored for a certain period of time in order to respond to a UE request in case of broadcast/multicast transmission failure.

In operation 11, the UE may transmit the MBS session traffic for broadcast/multicast transmission received from the BS to a higher layer so that the MBS session traffic previously received through unicast transmission may be received without service interruption. When a portion of MBS session traffic through unicast transmission is not transmitted, the UE may request the BS to transmit unicast traffic stored in the BS, or may request the BM-SC, the BM-CPF, the BM-UPF, or the AS to transmit untransmitted MBS session traffic.

Figure 5:
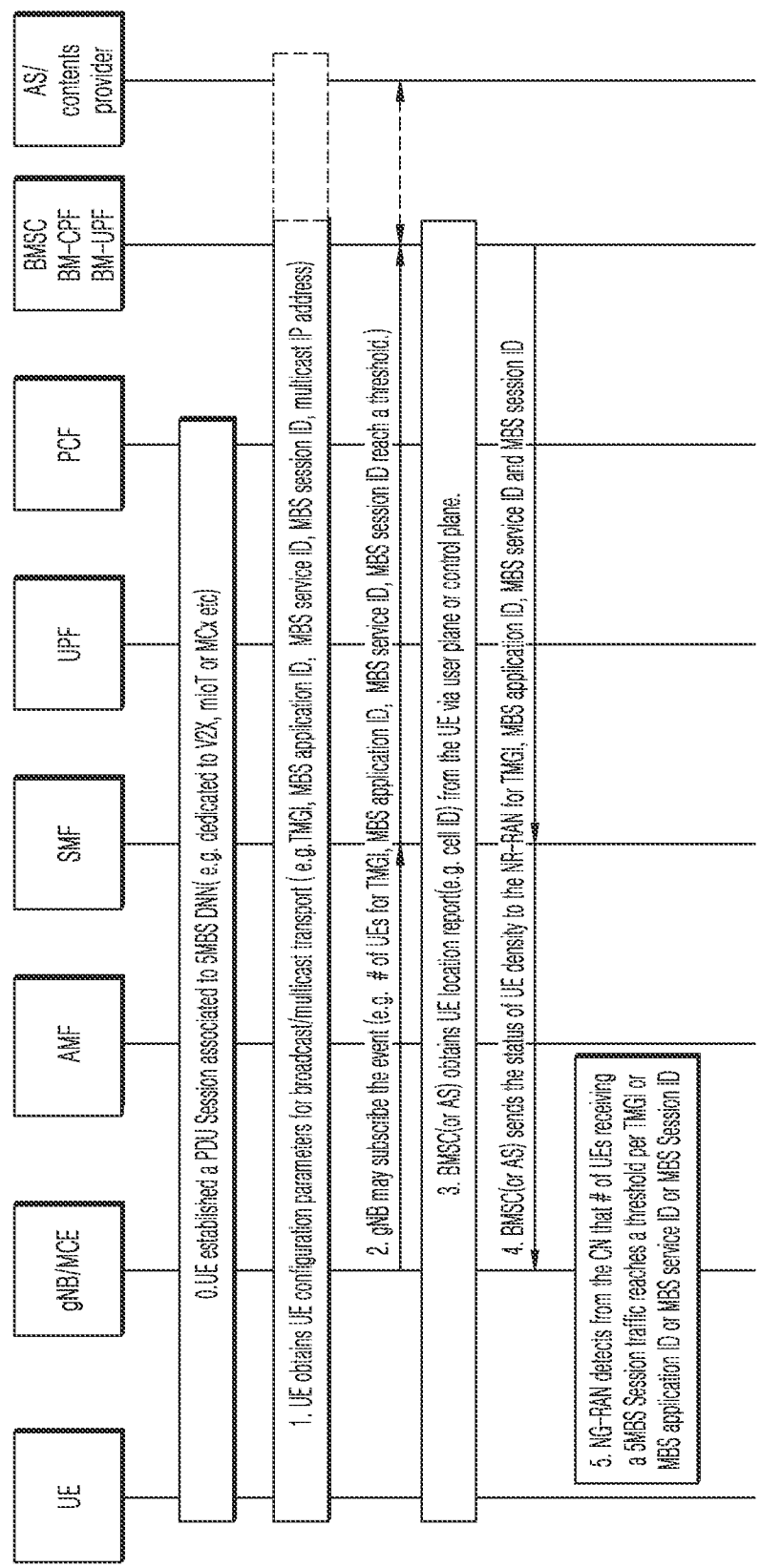
FIG. 5 is a diagram illustrating a method of determining, by a base station (BS), whether to switch from a unicast scheme to a multicast/broadcast scheme with the help of a 5G core network (CN), according to an embodiment of the disclosure.

FIG. 5 is a diagram illustrating a method of determining, by a BS, whether to switch from a unicast scheme to a multicast/broadcast scheme with the help of a 5G core network (CN), according to an embodiment of the disclosure.

In operation 0, the UE may generate a PDU session for unicast for an MBS session service, and in operation 1, the UE may obtain UE configuration information necessary for switching to broadcast/multicast through an accept message for PDU session setup. For example, when the UE transmits a PDU session setup request message, a DNN for an MBS session service to be received by the UE may be included in the PDU session setup request message. For example, a DNN such as V2X_DNN, which is a DNN for V2X, PS_DNN, which is a DNN for public safety, MC_DNN, which is a DNN for mission critical communication, and TV_DNN, which is a DNN for IPTV may be included in the PDU session setup request message. For the MBS session service corresponding to the DNN, the UE configuration information necessary for switching to broadcast/multicast may include information about a TMGI, an MBS application ID, an MBS service ID, an MBS session ID, an MBS service flow ID, a multicast IP address, and a common RNTI.

In operation 1, when the UE does not obtain the UE configuration information necessary for switching to broadcast/multicast, the UE may obtain the UE configuration information necessary for switching to broadcast/multicast for the MBS session service by accessing an AS, an MBS contents provider, a BMSC, or a BM-CPF.

Through operation 2, in order to identify whether the number of UEs corresponding to a particular TMGI, a particular MBS application ID, a particular MBS service ID, a particular MBS session ID, or a particular MBS service flow ID reaches a threshold, the BS may request, to the BMSC or the BM-CPF, an event subscription requesting a notification when the number of UEs reaches the threshold, and the SMF may request, back to the BMSC or the BM-CPF, an event subscription requesting a notification when the number of reaches the threshold.

According to another embodiment, in order for the BS itself to determine whether the threshold is reached, instead of the BM-SC or the BM-CPF, an event subscription for a value for the number of particular UEs may be requested. Through operation 3, the BMSC, the BM-CPF, or the AS receiving the request may identify the number of UEs in the corresponding BS for each TMGI, MBS application ID, MBS service ID, MBS session ID, and MBS service flow ID. A method of identifying the umber of UEs is to allow the UE to report a location of the UE, that is, a cell ID, through a user plane or a control plane so that the number of UEs in the corresponding BS may be identified for each TMGI, MBS application ID, MBS service ID, MBS session ID, and MBS service flow ID, which are being serviced.

Meanwhile, in operation 4, when a condition of event subscription requested by the BS is satisfied, the BMSC, the BM-CPF, or the AS may transmit, to the BS via the SMF, information about the number of UEs connected to the BS or a data rate at which the service is received. Through this, in operation 5, the BS may identify the number of UEs for MBS application ID, MBS service ID, MBS session ID, or MBS service flow ID and compare the number of UEs with a threshold value to identify whether to switch to broadcast/multicast.

A value for threshold may be previously configured in the BS, or a network operator may transmit an appropriate value to the BS via O&M.

Figure 6:
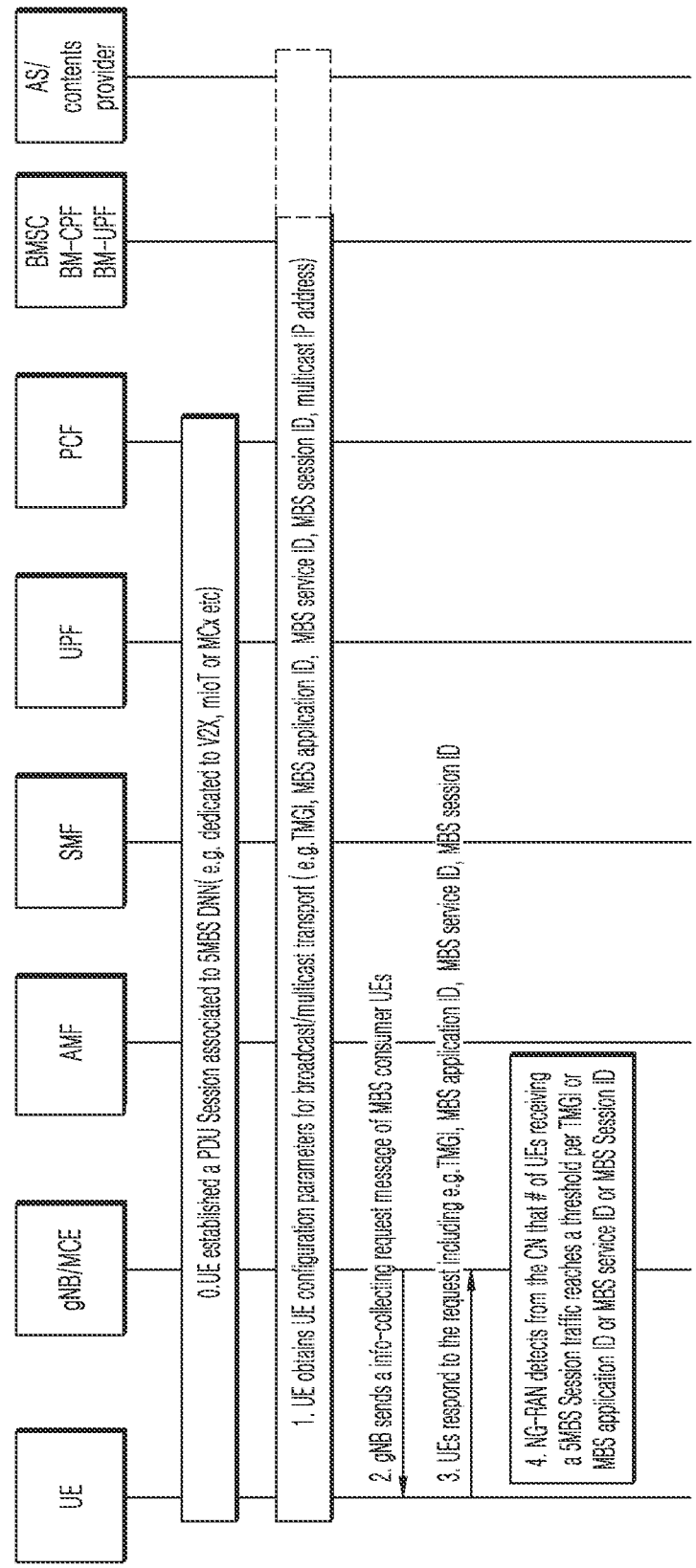
FIG. 6 is a diagram illustrating a method of determining, by a BS, whether to switch from a unicast scheme to a multicast broadcast scheme with the help of a user equipment (UE), according to an embodiment of the disclosure.

FIG. 6 is a diagram illustrating a method of determining, by a BS, whether to switch from a unicast scheme to a multicast/broadcast scheme with the help of a UE, according to an embodiment of the disclosure.

In operation 0, a UE may generate a PDU session for unicast for an MBS session service, and in operation 1, the UE may obtain UE configuration information necessary for switching to broadcast/multicast through an accept message for PDU session setup. For example, when the UE transmits a PDU session setup request message, a DNN for an MBS session service to be received by the UE may be included in the PDU session setup request message. For example, a DNN such as V2X_DNN, which is a DNN for V2X, PS-DNN, which is a DNN for public safety, MC_DNN, which is a DNN for mission critical communication, and TV_DNN, which is a DNN for Internet Protocol television (IPTV), may be included in the PDU session setup request message. For the MBS session service corresponding to the DNN, information such as a TMGI, an MBS application ID, an MBS service ID, an MBS session ID, an MBS service flow ID, a multicast IP address, and a common RNTI may be included in the UE configuration information necessary for switching to broadcast/multicast.

In operation 1, when the UE does not obtain the UE configuration information necessary for switching to broadcast/multicast, the UE may obtain the UE configuration information necessary for switching to broadcast/multicast for the MBS session service by accessing an AS, an MBS contents provider, a BMSC, or a BM-CPF.

In operation 2, in order for the BS to directly count the number of UEs that are camped on the BS and receive the MBS session service, the BS may transmit a broadcast message to the UEs to broadcast a request for information collecting requesting the UEs receiving the MBS session service to notify the BS, or may directly transmit a request to each of the UEs through a radio resource control (RRC) message.

The UEs receiving the request may transmit, to the BS, a reply message including information about an MBS session service consumed by the UE. The information about the MBS session service may include a TMGI, an MBS application ID, an MBS service ID, an MBS session ID, and an MBS service flow ID.

Accordingly, in operation 4, the BS may identify the number of UEs for TMGI, MBS application ID, MBS service ID, MBS session ID, or MBS service flow ID and compare the number of UEs with a threshold value to identify whether to switch to broadcast/multicast. Meanwhile, the threshold according to an embodiment may be differently configured for each MBS application, MBS service, MBS session, MBS service flow, and multicast IP address.

A value for threshold may be previously configured in the BS, or a network operator may transmit an appropriate value to the BS via O&M.

Figure 7:
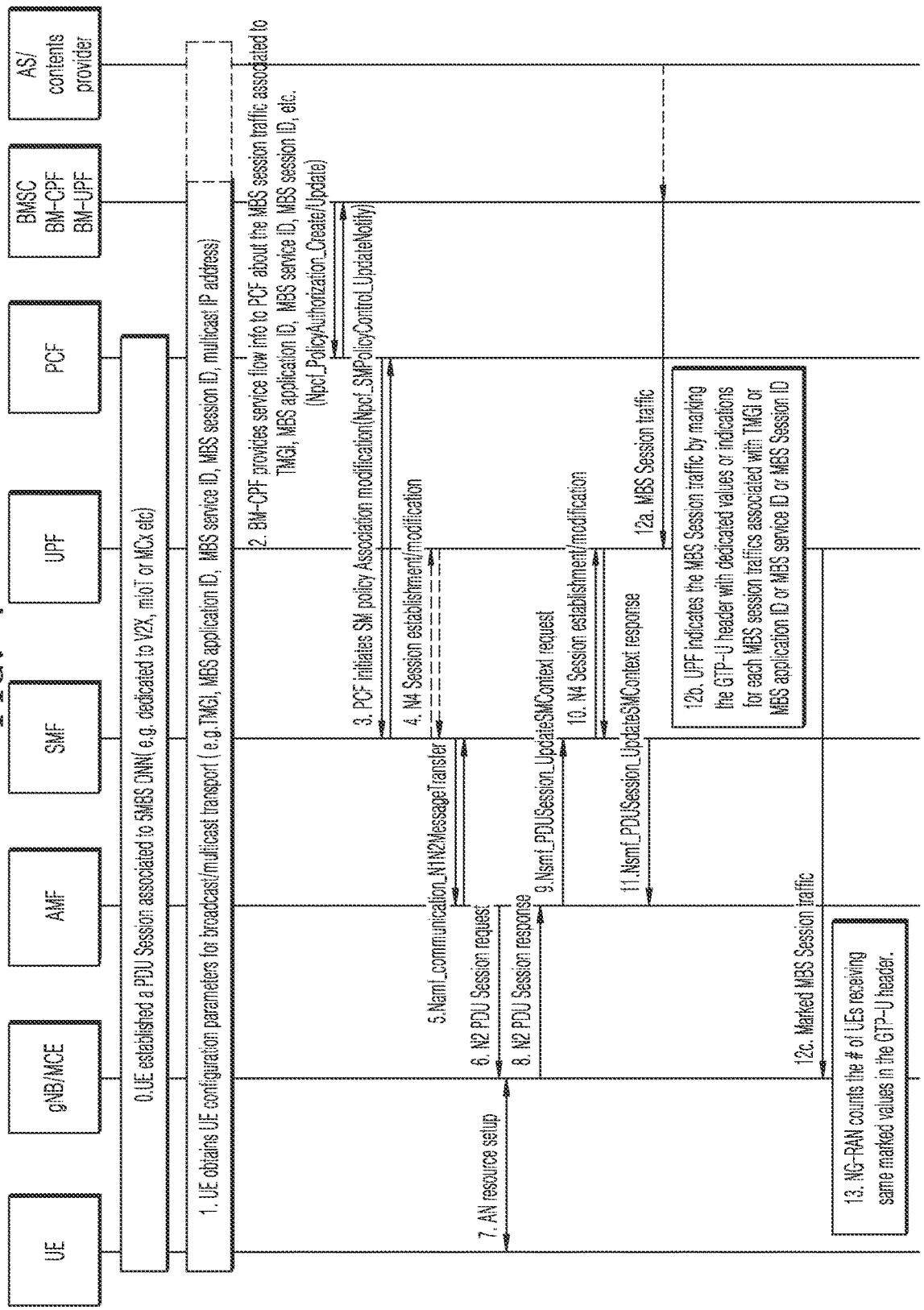
FIG. 7 is a diagram illustrating a process of determining, by a BS, whether to switch from a unicast scheme to a multicast/broadcast scheme based on a general packet radio service (GPRS) tunnelling protocol user (GTP-U) header, according to an embodiment of the disclosure.

FIG. 7 is a diagram illustrating a process of determining, by a BS, whether to switch from a unicast scheme to a multicast/broadcast scheme based on a general packet radio service (GPRS) tunnelling protocol user (GTP-U) header, according to an embodiment of the disclosure.

In operation 0, the UE may generate a PDU session for unicast for an MBS session service, and in operation 1, the UE may obtain UE configuration information necessary for switching to broadcast/multicast through an accept message for PDU session setup. For example, when the UE transmits a PDU session setup request message, a DNN for an MBS session service to be received by the UE may be included in the PDU session setup request message. For example, a DNN such as V2X_DNN, which is a DNN for V2X, PS-DNN, which is a DNN for public safety, MC_DNN, which is a DNN for mission critical communication, and TV_DNN, which is a DNN for Internet Protocol television (IPTV), may be included in the PDU session setup request message. For the MBS session service corresponding to the DNN, information such as a TMGI, an MBS application ID, an MBS service ID, an MBS session ID, an MBS service flow ID, a multicast IP address, and a common RNTI may be included in the UE configuration information necessary for switching to broadcast/multicast.

In operation 1, when the UE does not obtain the UE configuration information necessary for switching to broadcast/multicast, the UE may obtain the UE configuration information necessary for switching to broadcast/multicast for the MBS session service by accessing an AS, an MBS contents provider, a BMSC, or a BM-CPF.

In operation 2, the BM-CPF, the BMSC, or the AS may transmit characteristic information for MBS session traffic that may occur in the MBS session service to a Point Coordination Function (PCF) through an Npcf_PolicyAuthorization_Create message and an Npcf_PolicyAuthorizaion_Update message. In other words, the characteristic information for the MBS session traffic corresponding to the TMGI, the MBS application ID, the MBS service ID, the MBS session ID, or the MBS service flow ID may be transmitted to the PCF so that the corresponding traffic may be separately managed in a communication network.

Accordingly, in operation 3, the PCF may transmit the Npcf_SMPolicyControl_UpdateNotify messages to the SMF so that the traffic corresponding to the TMGI, the MBS application, the MBS service ID, the MBS session ID, or the MBS service flow may be separately managed in the communication network.

For example, in operation 4, the SMF may transmit N4 session establishment or N4 session modification messages to allow the UPF to assign a particular service class indicator (SCI) to a GTP-U header so that the traffic corresponding to the TMGI, the MBS application ID, the MBS service ID, the MBS session ID, or the MBS service flow ID may be switched to broadcast/multicast.

Accordingly, in the traffic transmitted by the UPF, it may be indicated through the particular SCI value of the GTP-U header that the corresponding traffic is an MBS session traffic that may be switched from unicast to broadcast/multicast.

In addition, even when the MPS application ID and the MBS service ID are the same as each other, when the MBS session ID or the MBS service flow ID is different, different values may be assigned to the particular SCI values of the GTP-U header. In addition, according to another embodiment, the same SCI value may be assigned to the particular SCI values of the GTP-U header for each MBS application ID or for each MBS service ID. Alternatively, instead of configuring SCI values corresponding to a TMGI, an MBS application ID, an MBS service ID, an MBS session ID, an MBS service flow ID every time, the BS may configure, in advance, an appropriate value between the BS and the UPF so that a predefined value may be used for the SCI value of the GTP_U header without negotiation.

Meanwhile, the above description of operation 4 may be performed in operation 10.

Information about the SCI values of the GTP-U header applied through operations 5 to 11 may be transmitted to next generation node B (gNB), and based on this, a new tunnel for transmitting the MBS session traffic may be generated, or an existing tunnel may be modified.

Through operations 12a to 12c, the UPF receiving the MBS session traffic from the BMSC or the BM-UPF may detect MBS session traffic and mark the configured SCI value on the corresponding GTP-U and transmit the GTP-U to the BS. In operation 13, the BS may receive, from the UPF, MBS session traffic transmitted to the UE via unicast and forward the MBS session traffic to the UE. As in operation 13, by counting the number of UEs receiving unicast traffic for a QoS flow corresponding to a particular assigned SCI value, the number of UEs per MBS application ID, the number of UEs per MBS service ID, or the number of UEs per MBS session ID or MBS service flow may be counted. In addition, a data rate of traffic used by the UEs for each MBS application ID, a data rate used by the UEs for each MBS service ID, a data rate used by the UEs for each MBS session ID or MBS service flow ID may be measured. The BS may compare measured information and compare each of the measurement with a threshold value so as to determine whether to switch to broadcast/multicast.

A value for threshold may be previously configured in the BS, or a network operator transmits an appropriate value to the BS via O&M, or the value for threshold may be received by the PCF from the BMSC or the BM-CPF in operation 2, then transmitted to the SMF in operation 3, and a threshold value may be transmitted to the BS in operation 5/operation 6, or the value for threshold may be transmitted to the SMF by the PCF in operation 3, and transmitted to the BS in operation 5/operation 6, or a threshold value may be transmitted to the BS by the SMF in operation 5/operation 6. Therefore, the BS may receive an appropriate threshold value. Based on the received value, the BS may identify the MBS session traffic through dedicated SCI values of the GTP-U header and determine whether to switch a transmission scheme of the corresponding MBS session traffic to broadcast/multicast.

Figure 8:
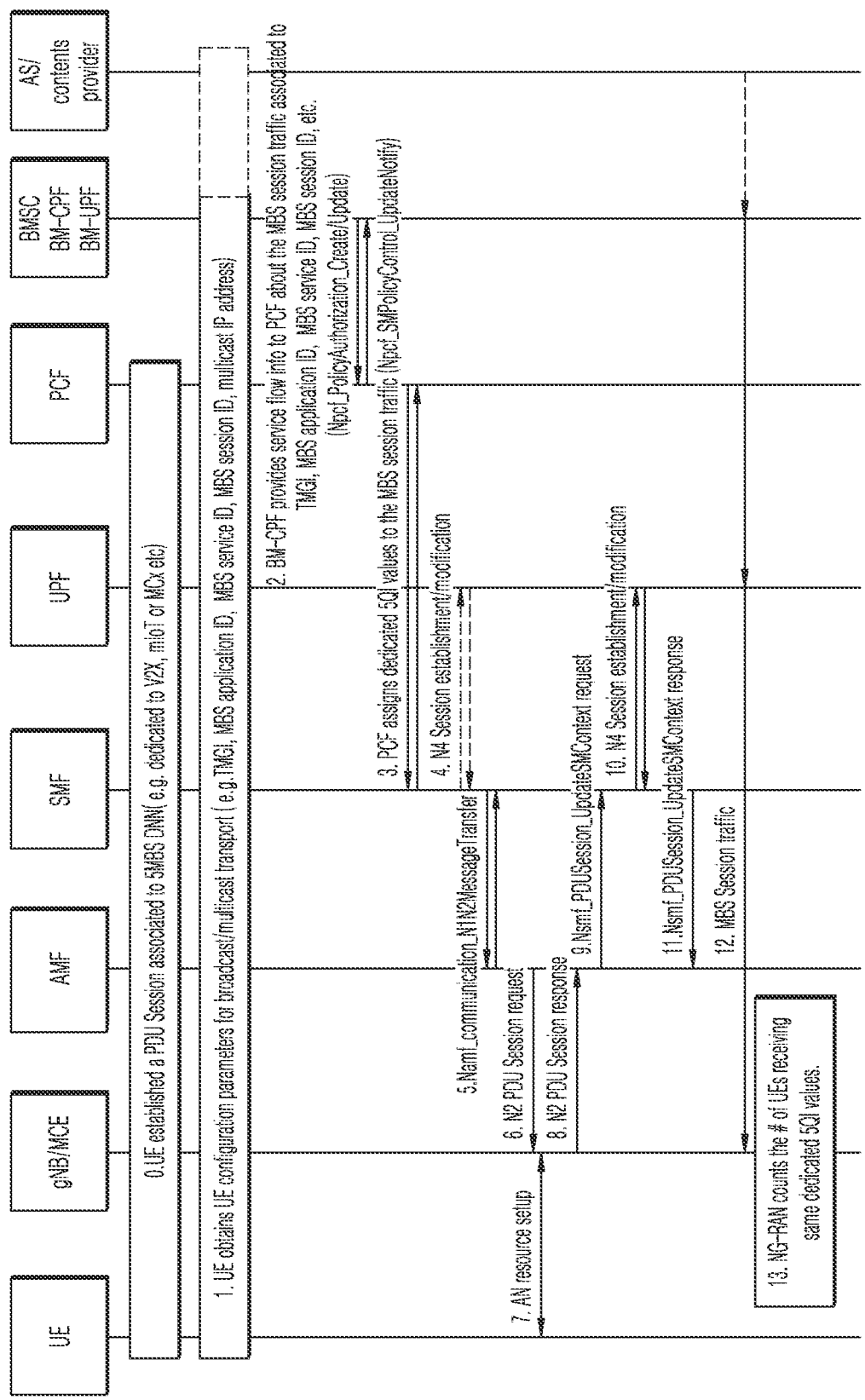
FIG. 8 is a diagram illustrating a method of determining, by a BS, whether to switch from a unicast scheme to a multicast/broadcast scheme based on a dedicated 5G quality of service (QoS) identifier (5QI) value, according to an embodiment of the disclosure.

FIG. 8 is a diagram illustrating a method of determining, by a BS, whether to switch from a unicast scheme to a multicast/broadcast scheme based on a dedicated 5QI value, according to an embodiment of the disclosure.

In operation 0, the UE may generate a PDU session for unicast for an MBS session service, and in operation 1, the UE may obtain UE configuration information necessary for switching to broadcast/multicast through an accept message for PDU session setup. For example, when the UE transmits a PDU session setup request message, a DNN for an MBS session service to be received by the UE may be included in the PDU session setup request message. For example, a DNN such as V2X_DNN, which is a DNN for V2X, PS-DNN, which is a DNN for public safety, MC_DNN, which is a DNN for mission critical communication, and TV_DNN, which is a DNN for Internet Protocol television (IPTV), may be included in the PDU session setup request message. For the MBS session service corresponding to the DNN, information such as a TMGI, an MBS application ID, an MBS service ID, an MBS session ID, an MBS service flow ID, a multicast IP address, and a common RNTI may be included in the UE configuration information necessary for switching to broadcast/multicast.

In operation 1, when the UE does not obtain the UE configuration information necessary for switching to broadcast/multicast, the UE may obtain the UE configuration information necessary for switching to broadcast/multicast for the MBS session service by accessing an AS, an MBS contents provider, a BMSC, or a BM-CPF.

In operation 2, the BM-CPF, the BMSC, or the AS may transmit characteristic information for MBS session traffic that may occur in the MBS session service to a PCF through an Npcf Policy Authorization Create message and an Npcf_PolicyAuthorization_Update message. In other words, characteristic information for MBS session traffic corresponding to a an MBS application ID, an MBS service ID, an MBS session ID, and an MBS service flow ID may be transmitted to the PCF so that particulars 5QI values may be assigned to the corresponding traffic in a communication network. In addition, through the particular 5QI value, it may be indicated that traffic having the corresponding 5QI value is MBS session traffic that may be switched from unicast to broadcast/multicast.

In addition, even when the MBS application ID and the MBS service ID are the same as each other, when the MBS session ID or the MBS service flow ID is different, particular 5QI values different from each other may be assigned to the 5QI values, or the same 5QI value may be assigned for each MBS application ID or for each MBS service ID.

Accordingly, in operation 3, the PCF transmits Npcf_SM-PolicyControl_UpdateNotify messages to the SMF to assign particular 5QI values so as to be used in the MBS session traffic corresponding to the TMGI, the MBS application the MBS service ID, the MBS session ID, and the MBS service flow ID.

In operation 4, the SMF allows the UPF to set up a tunnel for traffic through N4 Session establishment or N4 Session modification messages and apply the 5QI values.

In addition, through operations 5 to 11, information about the applied 5QI values may be transmitted to the BS, and based on the information, a tunnel for transmitting MBS session traffic may be newly generated, or an existing tunnel may be modified.

Through operation 12, in a process in which the BS receives, from the UPF, MBS session traffic to be transmitted via unicast and forwards the received MBS session traffic to the UE, by counting the number of UEs receiving unicast traffic for a QoS flow corresponding to a particular assigned 5QI as in operation 13, the number of UEs per MBS application ID, the number of UEs per MBS service ID, the number of UEs per MBS session ID or MBS service flow ID may be counted. In addition, a data rate of traffic used by the UEs for each MBS application ID, a data rate used by the UEs for each MBS service ID, a data rate used by the UEs for each MBS session ID or MBS service flow ID may be measured. The BS may compare measured information and compare each of the measurement with a threshold value so as to determine whether to switch to broadcast/multicast.

A value for threshold may be previously configured in the BS, or a network operator transmits an appropriate value to the BS via O&M, or the value for threshold may be received by the PCF from the BMSC or the BM-CPF in operation 2, then transmitted to the SMF in operation 3, and a threshold value may be transmitted to the BS in operation 5/operation 6, or the value for threshold may be transmitted to the SMF by the PCF in operation 3, and transmitted to the BS in operation 5/operation 6, or a threshold value may be transmitted to the BS by the SMF in operation 5/operation 6. Therefore, the BS may receive an appropriate threshold value. In addition, the BS may identify MBS session traffic through the dedicated 5QI value as described above, based on the received value and determine whether to switch a transmission scheme of the corresponding MBS traffic from unicast to broadcast/multicast.

Figure 9:
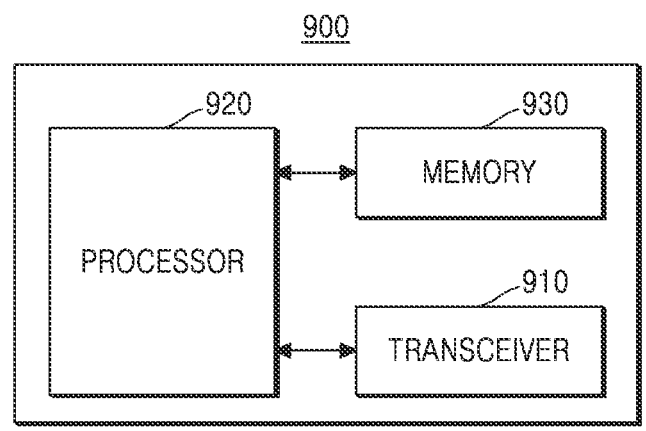
FIG. 9 is a block diagram of a structure of a BS according to an embodiment of the disclosure.

FIG. 9 is a block diagram of a structure of a BS 900 according to an embodiment of the disclosure.

Referring to FIG. 9, the BS 900 may include a transceiver 910, a processor 920, and a memory 930. According to a transmission scheme of the above-described BS 900, the transceiver 910, the processor 920, and the memory 930 may be operated. However, elements of the BS 900 are not limited to the above example. For example, the BS 900 may include more elements (e.g., a network interface controller (NIC)) than the above-described elements, or may include less elements. Furthermore, the transceiver 910, the processor 920, and the memory 930 may be implemented as a single chip.

The transceiver 910 may transmit and receive a signal to and from a network entity (e.g., a BMSC) or a UE. Here, the signal may include at least one message described above with reference to FIGS. 1 to 8. To this end, the transceiver may include a radio frequency (RF) transmitter for up-converting and amplifying a frequency of a transmitted signal and an RF receiver for low-noise amplifying a received signal and down-converting a frequency thereof. However, this is only an embodiment of the transceiver, and elements of the transceiver are not limited to the RF transmitter and the RF receiver.

In addition, the transceiver may receive a signal via a wireless channel and output the received signal to the processor 920, and transmit a signal output from the processor 920 via the wireless channel.

The processor 920 is hardware that may drive software for determining a transmission scheme of traffic, and for example, one or more central processing units (CPUs) may be included in the processor 920. The processor 920 may drive software stored in the memory 930, and in this case, a transmission and reception scheme configuration module including one or more instructions and a traffic processing module may be included in the software. The transmission reception scheme configuration module may determine unicast or broadcast/multicast as a method of transmitting traffic by the BS. Meanwhile, the transmission and reception scheme configuration module and the traffic processing module may be manufactured in the form of a separate chip distinguished from the processor 920.

The memory 930 may stoic software and data necessary for operations of the BS 900. In addition, the memory 930 may store control information or data included in the signal received from the BS 900. The memory may include a storage medium, such as read-only memory (ROM), random access memory (RAM), a hard disk, compact disk read-only memory (CD-ROM), and a digital versatile disc (DVD), or a combination of storage media.

Figure 10:
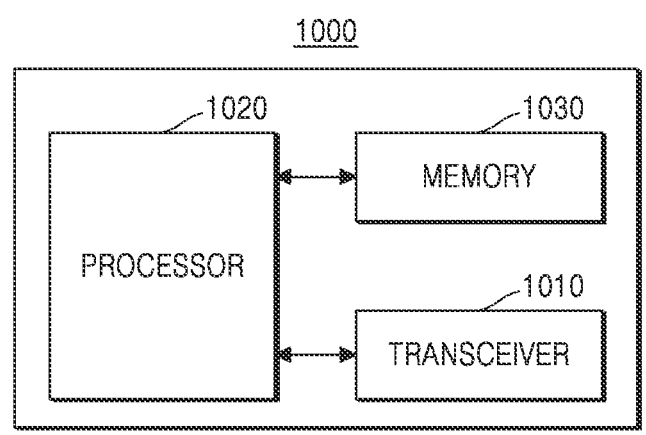
FIG. 10 is a block diagram of a structure of a UE according to an embodiment.

FIG. 10 is a block diagram of a structure of a UE 1000 according to an embodiment.

Referring to FIG. 10, the UE 1000 may include a transceiver 1010, a processor 1020, and a memory 1030. According to a transmission scheme of the above-described UE, the transceiver 1010, the processor 1020, and the memory 1030 may be operated. However, elements of the UE 1000 are not limited to the above example. For example, the UE 1000 may include more elements (e.g., an NIC) than the above-described elements, or may include less elements. Furthermore, the transceiver 1010, the processor 1020, and the memory 1030 may be implemented as a single chip.

The transceiver 1010 may transmit and receive a signal to and from the BS or other network entities. Here, the signal may include at least one message described above with reference to FIGS. 2 to 8. To this end, the transceiver may include an RF transmitter for up-converting and amplifying a frequency of a transmitted signal and an RF receiver for low-noise amplifying a received signal and down-converting a frequency thereof. However, this is only an embodiment of the transceiver, and elements of the transceiver are not limited to the RF transmitter and the RF receiver.

In addition, the transceiver may receive a signal via a wireless channel and output the received signal to the processor 1020, and transmit a signal output from the processor 1020 via the wireless channel.

The processor 1020 is hardware that may receive traffic according to a transmission scheme (e.g., unicast or broadcast/multicast) configured by the BS and drive software for processing the received traffic, and for example, one or more CPUs may be included in the processor 1020. The processor 1020 may drive software stored in the memory 1030, and in this case, a transmission and reception scheme configuration module including one or more instructions and a traffic processing module may be included in the software. The transmission and reception scheme configuration module may determine unicast or broadcast/multicast as a traffic reception scheme according to the transmission scheme determined by the BS. Meanwhile, the transmission and reception scheme configuration module and the traffic processing module may be manufactured in the form of a separate chip distinguished from the processor 1020.

FIG. 11 is a diagram illustrating a method of determining, by a BS, whether to switch from a unicast scheme to a multicast/broadcast scheme based on N2 context, according to an embodiment of the disclosure.

In operation 0, a CN may perform an MBS service initiation process for an MBS session service and a shared session setup for providing an MBS service. In this case, the procedures of operations 210, 220, and 240 are followed. In other words, in order to transmit MBS data traffic via the 5GS, an AS or an MBS contents provider may transmit information about MBS session data traffic to an MBS function of the 5GS network and obtain IP address information of a media anchor within the 5GS from which the MBS data is to be transmitted. The information about the MBS session data traffic may include not only characteristics of the MBS session data, but also an identification (ID) of a BS or cell from which the MBS session data traffic is to be transmitted.

For example, the above-described MBS function may include a BM-CPF, an SMF to which an MBS session management function is added, or a BMSC.

In addition, the media anchor within the 5GS may include a BM-UPF, a UPF to which a media source function for the MBS service session is added, or a BMSC.

The MBS function may generate MBS context for managing an MBS session in the 5GS and configure a control session for the MBS media anchor within the 5GS. In addition, the MBS function may generate a tunnel between BSs in an area within which the MBS data traffic is to be broadcast and a media anchor or may generate a tunnel between BSs in an area in which broadcast/multicast is to be performed and a UPF for broadcast/multicast or between the BSs and a UPF for an MBS. To this end, a control session for managing the tunnels may be configured. In describing the present embodiment, the control session may be referred to as a shared session, and as a term indicating the tunnel, a multicast shared tunnel and an IP multicast tunnel are interchangeably used to mean the same.

A process of setting up the multi cast shared tunnel may be performed through operations 5 to 11 later.

Meanwhile, in operation 1, a service announcement for the MBS service may be transmitted to a UE via an MBS function or an AS.

The MBS service announcement may include a DNN for an MBS session service. For example, a DNN such as V2X_DNN, which is a DNN for V2X, PS-DNN, which is a DNN for public safety, MC_DNN, which is a DNN for mission critical communication, and TV_DNN, which is a DNN for IPTV, may be included in the message.

In addition, the MBS service announcement may include UE configuration information, and may include, for example, information such as a TMGI, which is group information of UEs for broadcast/multicast, an MBS application ID, which is an ID of an application providing an MBS session service, an MBS service ID, which is an ID of the MBS session service used by the UE, an MBS session ID, which is an identity for a session of the MBS session service used by the UE, an MBS service flow ID, which is an identity for a service flow of an MBS session service used by the UE, and a multicast IP address to be used by the UE.

In operation 3, when transmitting a PDU session request message, the UE may include a DNN for a desired MBS session service in the PDU session request message. In addition, when the UE is in an MBS enable area, the LIE may transmit a message requesting to join a multicast service together with the PDU session request message.

In operation 4, an SMF receiving the PDU session request message may receive information about a TMGI subscribed by the UE through session management (SM) subscription data (subscriber information for session management) received from a unified data management (UDM), and through this, when a shared session for the same TMGI is present, may associate the PDU session with the shared session.

Meanwhile, the SMF may set up a multicast shared tunnel through operations 5 to 11. In particular, in operation 7, a resource for transmitting MBS data to be transmitted via a multicast shared tunnel, through a broadcast/multicast bearer may be assigned. For example, the resource may include information about a SC-PTM channel, such as common RNTI information.

The SMF may perform a remaining PDU session establishment process through operations 12 to 19. In other words, an N2 PDU session for processing data corresponding to the PDU session may be established in the BS, and a unicast tunnel may be generated between the BS and the UPF.

In particular, in operations 12 and 13, the SMF may include information about the shared session in context for the N2 PDU session and transmit the context to the BS via the AMF. For example, the information may include a TMGI, an MBS application ID, an MBS session ID, or an MBS service flow ID.

In addition, the BS, which also receives the information about the shared session, may store and manage, in context of a UE served by the BS, a list of TMGIs, an MBS service ID, which is an ID of an MBS session service used by the UE, an MBS session ID, which is an identity for a session of an MBS session service used by the UE, an MBS service flow ID, which is an identity for a service flow of an MBS session service used by the UE, or IP multicast tunnel information.

Accordingly, in operation 14, the BS determines a method of transmitting to the UE by using the same method as in operation 320 of FIG. 3, in consideration of the number of UEs using the same MBS session service. In this case, when it is determined that the BS performs transmission through the broadcast/multicast bearer, in operation 15, the BS may allocate, to the UE, a resource for performing transmission through the broadcast/multicast bearer assigned in operation 7 described above, and the UE may receive MBS data via broadcast/multicast through the resource information. The BS determining to perform transmission through the broadcast/multicast bearer may transmit the resource information to not only the UE, but also UEs using the same MBS session service via an RRC message, so that the UEs receiving the resource information may receive the MBS data through the broadcast/multicast bearer.

Operations 5 to 11 and operations 12 to 19 described above may be reversed in order or may be performed simultaneously.

In the above particular embodiments of the disclosure, the components included in the disclosure are expressed in the singular or plural according to the presented particular embodiments of the disclosure. However, the expression in the singular or plural form is appropriately selected according to the suggested situations for convenience of explanation and is not intended to limit the disclosure to the single or plural elements. Even when a certain element is expressed in the plural form, it may be provided with a single element, and even when a certain element is expressed in the singular form, it may be provided with a plurality of elements.

Although specific embodiments have been described in the detailed description of the disclosure, various modifications may be made without departing from the scope of the disclosure. Therefore, the scope of the disclosure should not be limited to the above-described embodiments of the disclosure and should be determined by the appended claims and the equivalents thereof.

What is claimed is:

1. A method of transmitting and receiving data by a base station (BS) in a wireless communication system, the method comprising:
    transmitting traffic to at least one user equipment (UE) connected to the BS via a unicast scheme;
    based on information about a number of UEs connected to the BS to use a particular application, a particular service, or a particular session, or information of traffic to be used by the UE, determining whether to switch a transmission scheme of the traffic from the unicast scheme to a broadcast/multicast scheme;
    as the broadcast/multicast scheme is determined as the transmission scheme of the traffic, transmitting a message informing that the transmission scheme of the traffic is to be switched; and
    when the number of UEs using the particular application, the particular service, or the particular session or the traffic of the UE exceeds a threshold, transmitting, to a core network device, an event subscription message requesting a notification therefor.

2. The method of claim 1,
    wherein the determining of whether to switch from the unicast scheme to the broadcast/multicast scheme comprises, as the notification is received from the core network device, determining the broadcast/multicast scheme as the transmission scheme.

3. The method of claim 1, wherein the event subscription message requests the information about the number of UEs using the particular application, the particular service, or the particular session or the traffic of the UE,
    wherein the determining of whether to switch from the unicast scheme to the broadcast/multicast scheme comprises, as a result of determining based on the information about the number of UEs or the traffic of the UE received from the core network device, when the number of UEs or the traffic of the UE exceeds a threshold, determining the broadcast/multicast scheme as the transmission scheme.

4. The method of claim 1, further comprising transmitting, to the at least one UE, a message requesting confirmation as to whether the particular application, the particular service, or the particular session is used,
    wherein the determining of whether to switch from the unicast scheme to the broadcast/multicast scheme comprises, based on information received from the UE in response to the requesting, determining the broadcast/multicast scheme as the transmission scheme.

5. The method of claim 1, further comprising, based on a value included in a general packet radio service (GPRS) tunnelling protocol user (GTP-U) of traffic obtained by the BS, identifying whether the at least one UE uses traffic of the particular application, the particular service, or the particular session that is transmittable by using the broadcast/multicast scheme,
    wherein the determining of whether to switch from the unicast scheme to the broadcast/multicast scheme comprises, as a result of the identifying, when the number of UEs or the traffic of the UE exceeds a threshold, determining the broadcast/multicast scheme as the transmission scheme.

6. The method of claim 1, further comprising, based on a 5G quality of service (QoS) identifier (5QI) for a flow of a QoS of traffic obtained by the BS, identifying whether the at least one UE uses traffic of the particular application, the particular service, or the particular session that is transmittable by using the broadcast/multicast scheme,
wherein the determining of whether to switch from the unicast scheme to the broadcast/multicast scheme comprises, as a result of the identifying, when the number of UEs or the traffic of the UE exceeds a threshold, determining the broadcast/multicast scheme as the transmission scheme.

7. A method of transmitting and receiving data by a user equipment (UE) in a wireless communication system, the method comprising:
transmitting traffic to a base station (BS) via a unicast scheme;
as a transmission scheme is switched from the unicast scheme to a broadcast/multicast scheme based on information about a number of UEs connected to the BS so as to use a particular application, a particular service, or a particular session, or information of traffic to be used by the UE, receiving a message informing that the transmission scheme of the traffic is to be switched based on an event subscription message requesting the information about the number of UEs using the particular application, the particular service, or the particular session or the traffic to be used by the UE;
as the message is received, identifying an application, a service, or a session in which the transmission scheme is changed; and
receiving traffic of the identified application, the identified service, or the identified session according to the broadcast/multicast scheme.

8. The method of claim 7, wherein the transmission scheme of the traffic is switched from the unicast scheme to the broadcast/multicast scheme when the number of UEs using the particular application, the particular service, or the particular session, or the traffic of the UE exceeds a threshold.

9. The method of claim 7, further comprising:
receiving, from the BS, a message requesting confirmation as to whether the particular application, the particular service, or the particular session is used; and
as the UE uses traffic of any of the particular application, the particular service, and the particular session, transmitting, to the BS, a message informing that the traffic is used.

10. A base station (BS) configured to transmit and receive data in a wireless communication system, the BS comprising:
a transceiver; and
a processor connected to the transceiver,
wherein the processor is configured to:
control the transceiver to transmit traffic to at least one user equipment (UE) connected to the BS via a unicast scheme;
based on information about a number of UEs connected to the BS to use a particular application, a particular service, or a particular session, or information of traffic to be used by the UE, determine whether to switch a transmission scheme of the traffic from the unicast scheme to a broadcast/multicast scheme;
as the broadcast/multicast scheme is determined as the transmission scheme of the traffic, control the transceiver to transmit a message informing that the transmission scheme of the traffic is to be switched; and
when the number of UEs using the particular application, the particular service, or the particular session or the traffic of the UE exceeds a threshold, control the transceiver to transmit, to a core network device, an event subscription message requesting a notification therefor.

11. The BS of claim 10, wherein the processor is further configured to:
determine whether to switch from the unicast scheme to the broadcast/multicast scheme; and
as the notification is received from the core network device, determine the broadcast/multicast scheme as the transmission scheme.

12. The BS of claim 10, wherein the
event subscription message requests the information about the number of UEs using the particular application, the particular service, or the particular session or the traffic of the UE, and the processor is further configured to:
determine whether to switch from the unicast scheme to the broadcast/multicast scheme; and
as a result of determining based on the information about the number of UEs or the traffic of the UE received from the core network device, when the number of UEs or the traffic of the UE exceeds a threshold, determine the broadcast/multicast scheme as the transmission scheme.

13. The BS of claim 10, wherein the processor is further configured to:
transmit, to the at least one UE, a message requesting confirmation as to whether the particular application, the particular service, or the particular session is used; and
based on information received from the UE in response to the requesting, determine the broadcast/multicast scheme as the transmission scheme.

14. The BS of claim 10, wherein the processor is further configured to:
based on a value included in a general packet radio service (GPRS) tunnelling protocol user (GTP-U) of traffic obtained by the BS, identify whether the at least one UE uses traffic of the particular application, the particular service, or the particular session that is transmittable by using the broadcast/multicast scheme; and
as a result of the identifying, when the number of UEs or the traffic of the UE exceeds a threshold, determine the broadcast/multicast scheme as the transmission scheme.

15. The BS of claim 10, wherein the processor is further configured to:
based on a 5G quality of service (QoS) identifier (5QI) for a flow of a QoS of traffic obtained by the BS, identify whether the at least one UE uses traffic of the particular application, the particular service, or the particular session that is transmittable by using the broadcast/multicast scheme; and
as a result of the identifying, when the number of UEs or the traffic of the UE exceeds a threshold, determine the broadcast/multicast scheme as the transmission scheme.

* * * * *